United States Patent
Martch et al.

(10) Patent No.: US 7,899,395 B2
(45) Date of Patent: *Mar. 1, 2011

(54) APPARATUS AND SYSTEMS FOR ELECTRICALLY ISOLATING A RECEIVER FROM AN ANTENNA

(75) Inventors: Henry Gregg Martch, Parker, CO (US); Kirk Lenzie, Aurora, CO (US); Sam Chaisitti, Westminster, CO (US); Paul Langer, Westminster, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 588 days.

This patent is subject to a terminal disclaimer.

(21) Appl. No.: 12/024,745

(22) Filed: Feb. 1, 2008

(65) Prior Publication Data

US 2009/0167626 A1 Jul. 2, 2009

Related U.S. Application Data

(63) Continuation of application No. 11/966,738, filed on Dec. 28, 2007.

(51) Int. Cl.
*H04B 1/06* (2006.01)
(52) U.S. Cl. .............. 455/41.1; 455/3.02; 333/24 R; 219/130.1; 363/21.04
(58) Field of Classification Search .............. 455/3.01, 455/3.02, 41.1, 41.2, 67.11, 73, 550.1; 333/24 R; 219/130.1; 363/21.01, 21.04, 21.08
See application file for complete search history.

(56) References Cited

U.S. PATENT DOCUMENTS

| 4,238,799 | A |   | 12/1980 | Parfitt |
|---|---|---|---|---|
| 4,764,773 | A |   | 8/1988 | Larsen et al. |
| 4,857,727 | A |   | 8/1989 | Lenz et al. |
| 5,576,940 | A | * | 11/1996 | Steigerwald et al. ........... 363/17 |
| 5,612,652 | A |   | 3/1997 | Crosby |
| 5,734,355 | A |   | 3/1998 | Watanabe |
| 5,841,467 | A |   | 11/1998 | Davidson |
| 5,929,718 | A |   | 7/1999 | Crosby |
| 6,057,873 | A |   | 5/2000 | Adams, III |
| 6,232,926 | B1 |   | 5/2001 | Nguyen et al. |
| 6,407,402 | B1 | * | 6/2002 | Ghaseminejad ............. 250/551 |
| 6,690,923 | B1 | * | 2/2004 | Ortiz Perez et al. ......... 455/74.1 |
| 6,718,079 | B1 |   | 4/2004 | Gidon |
| 7,079,722 | B2 |   | 7/2006 | Mahbobi |

(Continued)

FOREIGN PATENT DOCUMENTS

DE  2821377 A1  11/1979

(Continued)

OTHER PUBLICATIONS

International Search Report for PCT application PCT/US2008/083984, mailed on Mar. 11, 2009.

(Continued)

*Primary Examiner* — Nhan Le
(74) *Attorney, Agent, or Firm* — Max S. Gratton

(57) ABSTRACT

Various embodiments of apparatus and systems are provided for electrically isolating two devices while transferring power and RF signals therebetween. An electrical isolation apparatus includes an isolation transformer that operates to transfer electrical power between first and second devices. The electrical isolation apparatus also includes a decoupling device that transfers radio frequency (RF) signals between the first and second devices. The isolation transformer and the opto-isolator cooperatively operate to electrically isolate the first device from the second device.

20 Claims, 3 Drawing Sheets

U.S. PATENT DOCUMENTS

| | | |
|---|---|---|
| 7,113,750 B2 | 9/2006 | Eastwood |
| 7,151,818 B1 * | 12/2006 | Hanington et al. ........... 378/104 |
| 7,471,014 B2 * | 12/2008 | Lum et al. ...................... 307/83 |
| 7,593,747 B1 * | 9/2009 | Karam et al. ................. 455/522 |
| 2004/0110463 A1 | 6/2004 | Perlman |
| 2004/0257837 A1 * | 12/2004 | Xu et al. .................... 363/21.04 |
| 2007/0051712 A1 | 3/2007 | Kooken et al. |
| 2009/0167465 A1 * | 7/2009 | Martch et al. ............... 333/24 R |
| 2009/0168462 A1 * | 7/2009 | Schopfer et al. ........... 363/21.01 |

FOREIGN PATENT DOCUMENTS

| | | |
|---|---|---|
| EP | 1416583 A | 5/2004 |
| GB | 2248530 A | 4/1992 |

OTHER PUBLICATIONS

Notice of Allowance from U.S. Appl. No. 11/966,738, mailed Sep. 29, 2010.

* cited by examiner

APPARATUS AND SYSTEMS FOR ELECTRICALLY ISOLATING A RECEIVER FROM AN ANTENNA

RELATED APPLICATIONS

This application is a continuation of U.S. patent application Ser. No. 11/966,738, entitled "APPARATUS AND SYSTEMS FOR ELECTRICALLY ISOLATING AND TRANSMITTING RF SIGNALS BETWEEN TWO DEVICES", filed Dec. 28, 2007, which is hereby incorporated by reference in its entirety.

BACKGROUND

Electrical safety codes require grounding of externally mounted antennas, e.g., satellite antennas. Satellite antennas are typically earth grounded through a coaxial cable that is electrically coupled to a ground block or other grounded location outside a home. Any hazardous or excess currents contacting the satellite antenna (e.g., a lightning strike) flow to the earth ground rather than entering a home's electrical system. However, if a satellite antenna is ungrounded and accumulates electrical charge, for example charge induced by nearby lightning, wind friction or other mechanism, struck by lightning, then the current generated by the accumulated charge may enter a home's electrical system through the coaxial cable connected to the satellite antenna. This can potentially damage equipment within the home, or worse, injure the inhabitants of the home.

It is often problematic to earth ground a satellite antenna. For many structures, an earth ground path is not readily available near the installation location of a satellite antenna. For example, many apartment buildings and other multiple-dwelling structures do not have ground block connections available near each unit of the structure. As a result, a satellite antenna cannot be installed at the structure without violating electrical codes and compromising the safety of the inhabitants of the structure. Thus, a significant number of structures are unavailable to satellite television providers.

BRIEF DESCRIPTION OF THE DRAWINGS

The same number represents the same element or same type of element in all drawings.

DETAILED DESCRIPTION

The various embodiments described herein generally provide apparatus and systems for electrically isolating two devices while transmitting power and radio frequency (RF) signals between the devices. The isolator apparatus provides separate communication paths for the RF signals and the power, and decouples the first device from the second device. In at least one embodiment, the isolator apparatus transfers power and signals between a receiver (e.g., a set-top box) and an externally mounted antenna (e.g., a satellite antenna). The isolator apparatus passes the power and RF signals between the receiver and the antenna while electrically isolating the receiver from the antenna. The electrical isolation prevents hazardous currents contacting the antenna from entering a structure's wiring system.

The isolator apparatus provides at least two signal paths, including a communication path and a power path. Electrical power is transferred between the two devices through a transformer. In at least one embodiment, the transformer comprises an isolation transformer. A dielectric material may be utilized between the windings of the transformer that provides insulation against at least 10,000 V. A DC-DC converter, incorporating an isolation transformer, may be used to transfer electrical power between the two devices.

The isolator apparatus further includes a decoupling device for transferring RF signals between the receiver and the antenna. In at least one embodiment, the RF signals may be transferred between two devices using an opto-isolator. The opto-isolator converts the RF signals received from a first device (e.g., an antenna) into an optical signal and transfers the optical signal over a short transmission path. The optical signal is then converted back to an electrical signal and further transmitted to a second device (e.g., a receiver). In other embodiments, the RF signals may be transferred between the devices through a transformer. The RF signals and the electrical power are transmitted over a communication path that electrically decouples the two devices.

In at least one embodiment, multiple communication paths of the isolator apparatus, each including transformers and/or opto-isolators, are utilized to transfer different RF signals of varying frequencies. For example, an RF signal carrying television programming, which is modulated on a GHz frequency, may be transferred by the isolator apparatus across an opto-isolator. A separate RF signal including control information, which is modulated on a KHz frequency, may be transferred by the isolator apparatus across a transformer or a separate opto-isolator. Thus, the electrical isolator allows for the transmission of multiple signals between two devices while decoupling the two devices.

Figure 1:
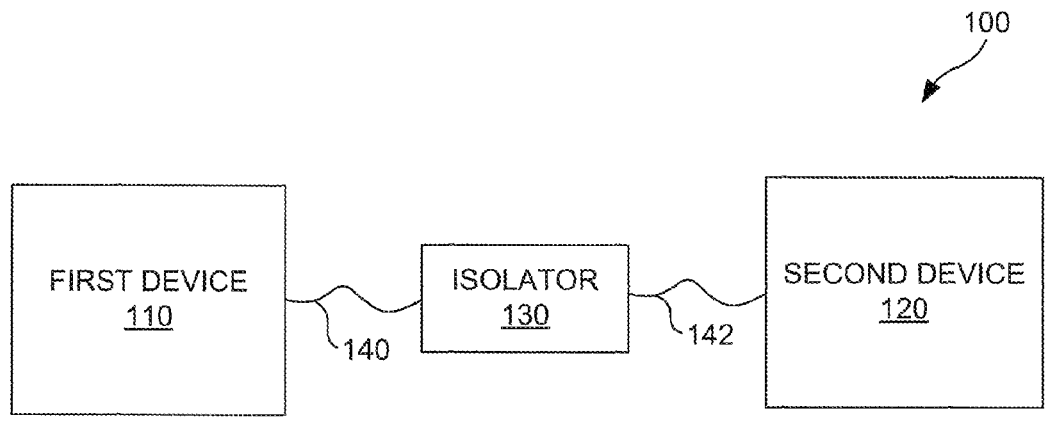
FIG. 1 illustrates an embodiment of a signal transmission system.

FIG. 1 illustrates an embodiment of a signal transmission system 100. The signal transmission system 100 includes a first device 110, a second device 120 and an isolator 130. The first device 110 is communicatively coupled to the isolator 130 through a first cable 140. The second device 120 is communicatively coupled to the isolator through a second cable 142. Each of the components of FIG. 1 will be subsequently described in detail below. Further, signal transmission system 100 may include other components, elements or devices not illustrated for the sake of brevity.

The first device 110 outputs RF signals onto the first cable 140. The first device 110 may generate the RF signals, or may re-transmit RF signals received from a signal source (not shown). In at least one embodiment, the first device 110 receives an RF signal from an external signal source (e.g., a satellite antenna), and up-converts or down-converts the RF signal for transmission through the signal transmission system 100.

In at least one embodiment, the first cable 140 comprises a coaxial cable, which is often used for transmitting television signals between two devices, e.g., a satellite antenna and a set-top box or a set-top box and a television. The coaxial cable may be connected to the first device 110 using an F-connector. However, it is to be appreciated that the first cable 140 may comprise other types of wiring. For example, the first cable 140 may comprise composite video connectors (e.g., RCA connectors) or other types of cabling that include one or more conductors for carrying signals between the first device 110 and the second device 120.

The coaxial cable is configured to transmit electrical power and RF signals between the first device 110 and the second device 120. In at least one embodiment, the first device 110 receives electrical power from the second device 120, or other power sources within the structure, through the first cable 140. For example, the second device 120 may provide electrical power to the first device 110 through coaxial cable via the isolator 130.

The second device 120 may comprise any type of device capable of receiving, demodulating and processing RF signals outputted by the first device 110. In at least one embodiment, the first device 110 comprises a set-top box communicatively coupled to a presentation device (not shown in FIG. 1). The presentation device may comprise any device capable of presenting audio and/or video content to a user. Exemplary presentation devices include televisions, stereos, computers, telephones and the like. The second device 120 receives RF signals and demodulates the RF signals into a presentation format and outputs the presentation format to the presentation device. In some embodiments, the second device 120 may be integrated into a presentation device, e.g., a television. The second device 120 may also be coupled to other electronic devices that perform processing of received RF signals. For example, the second device 120 may be integrated with or coupled to a computer that performs data collection based on the RF signals and further transfers the collected data to other systems or electronic devices.

The second device 120 communicatively couples to the electrical isolator 130 through the second cable 142. In at least one embodiment, the second cable 142 comprises a coaxial cable. As described above, the second device 120 provides electrical power (e.g., a DC current) to the first device 110 through the second cable 142 via the isolator 130.

The electrical isolator 130 communicatively couples the first cable 140 and the second cable 142, thus, communicatively coupling the first device 110 with the second device 120. The electrical isolator 130 operates to transfer electrical power and/or RF signals from the second device 120 to the first device 110. The electrical isolator 130 includes one or more transformers, DC-DC converters and/or opto-isolators that function to transfer electrical power and/or RF signals between the first device 110 and the second device 120 while electrically isolating the second device 120 from the first device 110.

Figure 2:
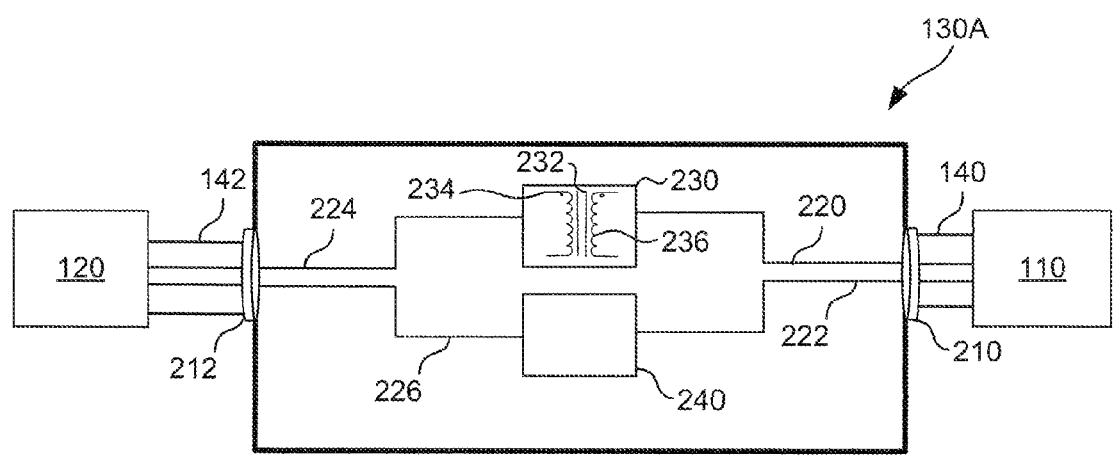
FIG. 2 illustrates an embodiment of an electrical isolator of FIG. 1.

FIG. 2 illustrates an embodiment of an electrical isolator 130A of FIG. 1. The electrical isolator 130A includes a first connector 210, a second connector 212, a first power path 220, a first communication path 222, a second power path 224, a second communication path 226, a transformer 230 and a decoupling device 240. Each of the components of the electrical isolator 130A will be subsequently described in detail below. Further, the electrical isolator 130A of FIG. 2 may include other components, elements or devices not illustrated for the sake of brevity.

The first connector 210 connects to the first cable 140, which is communicatively coupled to the first device 110. In at least one embodiment, the first connector 210 comprises an F-connector. The first connector 210 communicatively couples the first cable 140 to the first power path 220 and the first communication path 222 within the electrical isolator 130A. If the first cable 140 does not provide two separate signal paths for the electrical power and the RF signals, then the electrical isolator 130A may include a splitter/combiner to separate incoming signals from the first cable 140 into separate power and RF components. The splitter/combiner may further combine outgoing signals from the first power path 220 and the first communication path 222 for transmission along the single signal path provided by the first cable 140.

The second connector 212 may be similar to the first connector 210. The second connector 212 communicatively couples the second cable 142 to the second power path 224 and the second communication path 226 of the electrical isolator. If the second cable 142 does not include separate signal paths, then the electrical isolator may include a splitter/combiner for interfacing between the second cable 142 and the second power and communication paths 224 and 226.

The first power path 220 and the second power path 224 are communicatively coupled through the transformer 230. The transformer 230 minimally includes a magnetic core 232, first windings 234 and second windings 236. The first windings 234 are mounted on a first end of the magnetic core 232 and are communicatively coupled to the second device 120 through the second cable 142. The second windings 236 are mounted on a second end of the magnetic core opposite the first end and are communicatively coupled to the first device 110 through the first cable 140. The magnetic core 232 may comprise a single piece magnetic core or a multiple piece magnetic core 232 depending on desired design criteria.

The transformer 230 operates, through magnetic induction, to transfer electrical energy from the first windings 234 to the second windings 236. The second windings 236 output the electrical power, thus, transferring electrical power between the first power path 220 and the second power path 224. In at least one embodiment, the transformer 230 comprises an isolation transformer that provides a 1:1 power transformation. The transformer 230 operates to transfer AC currents between the first cable 140 and the second cable 142 while restricting the passage of DC currents from the first cable 140 to the second cable 142. The transformer 230 decouples the first power path 220 from the second power path 224, electrically isolating the first device 110 and the second device 120. In at least one embodiment, the first windings 234 and the second windings 236 may optionally transfer control signals (e.g., RF signals including control commands) between the second device 120 and the first device 110.

The first communication path 222 and the second communication path 226 are communicatively coupled through the decoupling device 240. The decoupling device 240 comprises any device capable of transferring electrical signals while electrically isolating two or more devices and/or circuits. In at least one embodiment, the decoupling device 240 comprises an opto-coupler, i.e., any device that converts an electrical signal into an optical signal and transmits the signal across a relatively short optical transmission path. The optical signal is then converted back to an electrical signal and further transmitted by the decoupling device 240. The optical transmission breaks electrical contact between the first device 110 and the second device 120, electrically isolating the second device 120 from the first device 110.

In at least one embodiment, the decoupling device 240 includes a transmitter/modulator and a receiver/demodulator. The decoupling device 240 may operate bi-directionally, transferring RF signals containing video content or other data from the first device 110 to the second device 120, and transferring RF signals containing control signals or other data from the second device 120 to the first device 110.

In at least one embodiment, the decoupling device 240 comprises an isolation transformer that operates similarly to the transformer 230. When embodied as an isolation transformer, the decoupling device 240 operates to transfer RF signals across the windings of the isolation transformer using magnetic induction, electrically decoupling the first device 110 from the second device 120. In at least one embodiment, the decoupling device 240 comprises a DC-DC converter that includes an isolation transformer, allowing for the transmission of DC signals outputted by the first device 110 while electrically isolating the first device 110 from the second device 120.

The transformer 230 and the decoupling device 240 cooperatively operate to electrically isolate the first device 110 from the second device 120, preventing hazardous currents from passing between the first and second devices 110 and 120. If the first device 110 comprises an antenna, then the isolator 130A eliminates the need to electrically ground the antenna to protect against rapid discharge of accumulated/stored electrical energy induced by nearby lightning, wind friction, or other mechanisms. The isolation provided by the isolator 130A prevents the stored energy from flowing and entering the house.

Further, in a lightning storm, clouds become polarized electrically. Negative charges move to the bottom side of the clouds and positive charges move to the top side of the clouds. During this event, positive charges will be induced on the surface of the Earth under the clouds. Lightning occurs from the clouds to the Earth if the Earth is at lower potential than the clouds. The positive charges thus have a tendency to migrate towards the surface of the Earth. Lightning occurs between the least resistive path between a cloud and the Earth. In some installations, an antenna and a coaxial cable provide the least resistive path between the cloud and the Earth. If the first device 110 (e.g., an antenna) is isolated from the second device 120 (e.g., a receiver), then the first device 110 does not provide the least resistive path between the cloud and the Earth due to the high impedance provided by the isolator 130A. Thus, the lightning will likely occur at another path between the cloud and the Earth that is less resistive. While the isolator 130A does not eliminate the likelihood that lightning will strike an antenna, the isolator 130A does significantly reduce the attractiveness of an isolated antenna to a lightning strike.

In one embodiment described herein, the isolator apparatus is utilized within a satellite television system. However, it is to be appreciated that the apparatus and systems described herein (and/or extensions and/or adaptations thereof) may be operable to provide electrical isolation between any type of electronic device and any antenna. For example, the isolator apparatus described herein may be utilized to electrically isolate receiving devices from WiMax antennas or over-the-air broadcast television antennas. Another attribute that makes the isolator apparatus desirable for grounding a satellite antenna is the premise that the satellite antenna dish is very small and has a low charge storage capacity. The isolator apparatus is highly effective for grounding small antennae systems like satellite reception systems since these isolated small systems have low charge storage capacity and, therefore, and are not a potential safety hazard.

Figure 3:
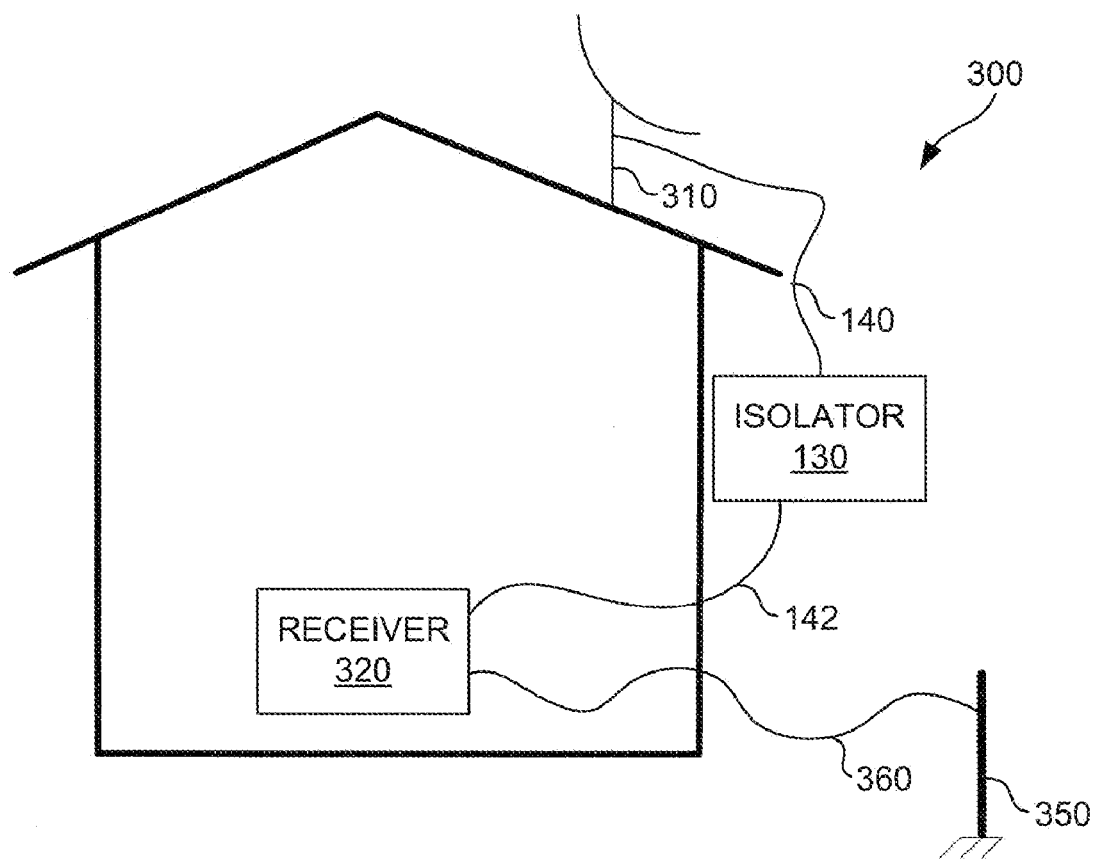
FIG. 3 illustrates an embodiment of a satellite television system.

FIG. 3 illustrates an embodiment of a satellite television system 300. The satellite television system 300 includes a satellite antenna 310, a receiver 320 and an electrical isolator 130. The satellite antenna 310 communicatively couples to the electrical isolator 130 through a first cable 140. The receiver 320 communicatively couples to the electrical isolator 130 through a second cable 142. The receiver 320 may optionally electrically couple to an earth ground 350 through an electrical connection 360. Each of the components of FIG. 3 will be subsequently described in detail below. Further, satellite television system 300 may include other components, elements or devices not illustrated for the sake of brevity.

The satellite antenna 310 receives RF signals from a signal source (not shown) and outputs the RF signals onto the first cable 140. In the illustrated embodiment, the satellite antenna 310 receives RF signals from an Earth orbiting satellite. However, it is to be appreciated that other types of antennas may be utilized, such as over-the-air broadcast antennas, WiMax antennas and the like which receive RF signals from terrestrial transmitters.

In at least one embodiment, the first cable 140 comprises a coaxial cable, which is often used for transmitting television signals between a satellite antenna and a receiver 320, such as a set-top box or television. The coaxial cable may be connected to the satellite antenna 310 and the isolator 130 through F-connectors. However, it is to be appreciated that the first cable 140 may comprise other types of wiring. For example, the first cable 140 may comprise composite video connectors (e.g., RCA connectors) or other types of cabling that include one or more conductors for carrying signals between the receiver 320 and the satellite antenna 310.

The coaxial cable is configured to transmit electrical power and RF signals between the receiver 320 and the satellite antenna 310. In at least one embodiment, the satellite antenna 310 receives electrical power from the receiver 320, or other power sources within the structure, through the first cable 140. For example, the receiver 320 may provide electrical power to the satellite antenna 310 through coaxial cable.

The receiver 320 may comprise any type of device capable of receiving, demodulating and processing RF signals outputted by the satellite antenna 310. In at least one embodiment, the receiver 320 comprises a set-top box communicatively coupled to a presentation device (not shown in FIG. 3). The presentation device may comprise any device capable of presenting audio and/or video content to a user. Exemplary presentation devices include televisions, stereos, computers, telephones and the like. The receiver 320 receives RF signals and demodulates the RF signals into a presentation format and outputs the presentation format to the presentation device. In some embodiments, the receiver 320 may be integrated into a presentation device, e.g., a television. The receiver 320 may also be coupled to other electronic devices that perform processing of received RF signals. For example, the receiver 320 may be integrated with or coupled to a computer that performs data collection based on the RF signals and further transfers the collected data to other systems or electronic devices.

The receiver 320 is optionally electrically coupled to an earth ground 350 through the electrical connection 360. In at least one embodiment, the electrical connection 360 includes a three prong power cord that is electrically coupled to a wiring system of the structure. It is to be appreciated that the receiver 320 may also be electrically coupled to the earth ground 350 or placed at an earth ground potential through other coupling techniques. In at least one embodiment, the receiver 320 may be electrically coupled to a wall outlet using a two-prong connection, and thus, may not be electrically coupled to the earth ground 350 as illustrated in FIG. 3.

The receiver 320 communicatively couples to the electrical isolator 130 through the second cable 142. In at least one embodiment, the second cable 142 comprises a coaxial cable. As described above, the receiver 320 provides electrical power (e.g., a DC current) to the antenna 310 through the second cable 142.

The electrical isolator 130 communicatively couples the first cable 140 and the second cable 142, thus, communicatively coupling the satellite antenna 310 with the receiver 320. The electrical isolator 130 operates to transfer electrical power and/or RF signals from the receiver 320 to the satellite antenna 310. The electrical isolator 130 includes one or more transformers and/or opto-isolators that function to transfer electrical power and/or RF signals between the satellite antenna 310 and the receiver 320 while electrically isolating the receiver 320 from the satellite antenna 310.

Figure 4:
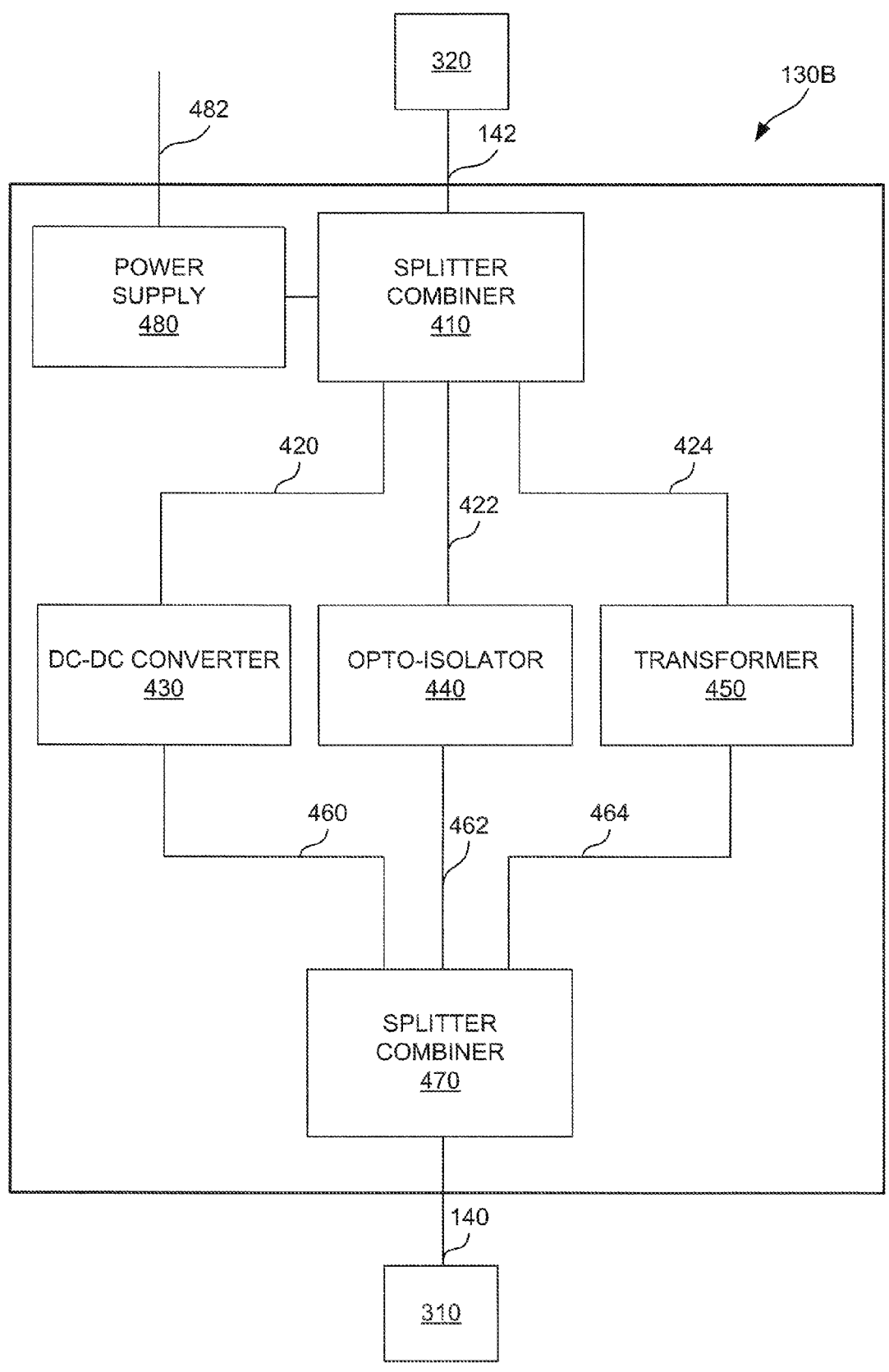
FIG. 4 illustrates the embodiment of an electrical isolator of FIG. 3.

FIG. 4 illustrates an embodiment of an electrical isolator 130B of FIG. 3. The electrical isolator 130B includes a splitter/combiner 410, a DC-DC converter 430, an opto-isolator 440, a control signal transformer 450, a splitter/combiner 470 and a power supply 480. The electrical isolator 130B also includes a first power path 420, a first communication path 422, a first signal path 424, a second power path 460, a second communication path 462 and a second signal path 464 that electrically couple the splitter/combiners 410 and 470 with the DC-DC converter 430, the opto-isolator 440 and the control signal transformer 450. Each of these components is discussed in greater detail below. The electrical isolator 130B may include other components, elements or devices not illustrated for the sake of brevity.

The splitter/combiner 410 connects to the second cable 142, which communicatively couples the electrical isolator 130B to the receiver 320. In at least one embodiment, the second cable 142 comprises a coaxial cable, and the splitter/combiner 410 communicatively couples to the second cable 142 through an F-connector. The splitter/combiner 410 separates a signal from the second cable 142 into components. In at least one embodiment, the components include an electrical power component, an RF component carrying video content and another RF signal carrying control signals between the satellite antenna 310 and the receiver 320. The control signals and the video content may be modulated on different frequency ranges. For example, the RF signals carrying the video programming may be modulated on the 950 MHZ-2350 MHz frequency range, and the RF signals carrying the control signals may be modulated in the 22 KHz frequency range.

The splitter/combiner 410 thus provides three separate data paths, including the first power path 420, the first communication path 422 and the first signal path 424. The first power path 420 is communicatively coupled to the DC-DC converter 430. The first communication path 422 is communicatively coupled to the opto-isolator 440, and the first signal path 424 is communicatively coupled to the control signal transformer 450.

In at least one embodiment, the electrical isolator 130B includes a power supply 480 that is communicatively coupled to a power source 482. The power supply 480 combines the electrical power received from the power source 482 with electrical power received from the second cable 142 to supplement the electrical power provided to the satellite antenna 310 by the receiver 320. In at least one embodiment, the power source 482 comprises a three-prong plug connected to a wiring system of the structure. However, it is to be appreciated that other power sources may be utilized to supply electrical power to the power supply 480.

Another splitter/combiner 470 connects to the first cable 140, which is communicatively coupled to the satellite antenna 310. The first cable 140 may also comprise a coaxial cable, and the splitter/combiner 470 may communicatively couple to the first cable 140 through an F-connector. The splitter/combiner 470 separates a signal on the first cable 140 into components. Similar to the components separated by the splitter/combiner 410, the splitter/combiner 470 may output an electrical power component, an RF signal component carrying video content and another RF signal component carrying the control signals between the satellite antenna 310 and the receiver 320.

The splitter/combiner 470 also provides three separate data paths, including the second power path 460, the second communication path 462 and the second signal path 464. The second power path 460 is communicatively coupled to the DC-DC converter 430. The second communication path 462 is communicatively coupled to the opto-isolator 440, and the second signal path 464 is communicatively coupled to the control signal transformer 450. The DC-DC converter 430, the opto-isolator 440, and the control signal transformer 450 communicatively couple the first and second cables 140 and 142, thus, communicatively coupling the satellite antenna 310 and the receiver 320. Simultaneously, the DC-DC converters 430 and 450 and the opto-isolator 440 decouple and electrically isolate the first cable 140 from the second cable 142.

The DC-DC converter 430 has an input communicatively coupled to the first power path 420, and an output communicatively coupled to the second power path 460. The DC-DC converter 430 receives electrical power from the first power path 420 and transfers the electrical power from its input to its output (i.e., to the second power path 460).

In at least one embodiment, the DC-DC converter 430 includes an isolation transformer. The isolation transformer may include a dielectric material that provides at least 10,000 V of insulation. Exemplary dielectric materials include rubber, rubber compounds, plastics, Mylar, epoxy resins, oil and like materials that are available for high voltage insulation. In at least one embodiment, the magnetic core of the isolation transformer comprises a magnetic material that is a relatively poor conductor. The high impedance of the magnetic material provides a larger resistive path such that high voltage currents from lightning strikes occur at less resistive paths between a cloud and the Earth. Ferrite is one exemplary high impedance material utilized for the magnetic core.

The opto-coupler 440 is communicatively coupled between the first and second communication paths 422 and 462. The opto-coupler receives an RF signal from the second communication path 462, and transfers the RF signal to the first communication path 422, electrically isolating the receiver 320 from the satellite antenna 310. The control signal transformer 450 is communicatively coupled between the first signal path 424 and the second signal path 464, and transfers a control signal between the first signal path 424 and the second signal path 464. One exemplary control signal transferred by the control signal transformer 450 is a 22 KHz Digital Satellite Equipment Control (DiSEqC) signal. The DiSEqC is a bi-directional communication protocol utilized between a receiver 320 and a satellite antenna 310.

The DC-DC converter 430, the opto-isolator 440 and the control signal transformer 450 cooperatively operate to electrically isolate the satellite antenna 310 from the receiver 320, eliminating the need to electrically ground the satellite antenna 310. Utilizing the isolator 130B, satellite antennas 310 may be installed in locations lacking a proper earth ground connection on the exterior of the structure. Thus, satellite television and other wireless services may now be provided in many structures that were previously considered unsafe for antenna installation.

Although specific embodiments were described herein, the scope of the invention is not limited to those specific embodiments. The scope of the invention is defined by the following claims and any equivalents therein.

What is claimed is:

1. An apparatus comprising:
   an isolation transformer having:
      a magnetic core;
      first windings mounted on a first end of the magnetic core and communicatively coupled to a receiver, the first windings receiving electrical power from the receiver; and
      second windings mounted on a second end of the magnetic core opposite the first end and communicatively coupled to an antenna, the magnetic core operating to transfer the electrical power from the first windings to the second windings, the second windings outputting the electrical power; and
   an opto-isolator that transfers radio frequency (RF) signals between the receiver and the antenna;
   the isolation transformer and the opto-isolator cooperatively operating to electrically isolate the antenna from the receiver.

2. The apparatus of claim 1, wherein the first windings and the second windings further transfer control signals between the receiver and the antenna.

3. The apparatus of claim 1, wherein the opto-isolator further transfers control signals between the receiver and the antenna.

4. The apparatus of claim 1, further comprising:
   a transformer communicatively coupled between the receiver and the antenna that transfers control signals between the receiver and the antenna.

5. The apparatus of claim 4 further comprising:
   a first splitter/combiner communicatively coupling the receiver to the first windings, the opto-isolator and the transformer; and
   a second splitter/combiner communicatively coupling the antenna to the second windings, the opto-isolator and the transformer.

6. The apparatus of claim 1, wherein the magnetic core comprises a single piece magnetic core.

7. The apparatus of claim 1, wherein the magnetic core comprises a multiple piece magnetic core.

8. The apparatus of claim 1, further comprising a power supply electrically coupled to a power source that supplements the electrical power provided to the antenna by the receiver.

9. An apparatus comprising:
   a first splitter/combiner communicatively coupled to a receiver through a first cable, the first splitter/combiner providing separate first power and communication paths communicatively coupled to the first cable;
   a DC-DC converter having an input and an output, the input communicatively coupled to the first power path, the DC-DC converter receiving electrical power from the first power path and transferring the electrical power from the input to the output, and electrically isolating the receiver from an antenna;
   a second splitter/combiner communicatively coupled to the output and communicatively coupled to the antenna through a second cable, the second splitter/combiner providing separate second power and communication paths communicatively coupled to the second cable, the second splitter/combiner transferring the electrical power from the output to the second cable through the second power path and receiving a radio frequency (RF) signal from the antenna through the second communication path; and
   an opto-isolator communicatively coupled to the first and second communication paths, the opto-isolator receiving the RF signal from the second communication path and transferring the RF signal to the first communication path, and electrically isolating the receiver from the antenna;
   wherein the first splitter/combiner receives the RF signal along the first communication path and transfers the RF signal to the first cable.

10. The apparatus of claim 9, wherein the DC-DC converter includes a dielectric material providing at least 10,000 volts of insulation.

11. The apparatus of claim 9, wherein the first splitter/combiner further provides a first signal path communicatively coupled to the first cable, and the second splitter/combiner further provides a second signal path communicatively coupled to the second cable, and wherein the apparatus further comprises a transformer that transfers a control signal between the first signal path and the second signal path.

12. The apparatus of claim 9, wherein the DC-DC converter transfers a control signal between the first power path and the second power path.

13. The apparatus of claim 9, wherein the opto-isolator transfers a control signal between the first communication path and the second communication path.

14. The apparatus of claim 9, wherein the DC-DC converter comprises a single piece magnetic core.

15. The apparatus of claim 9, wherein the DC-DC converter comprises a multiple piece magnetic core.

16. A system comprising:
   a receiver that receives and demodulates radio frequency (RF) signals into a presentation format and outputs the presentation format to a presentation device;
   an antenna that receives the RF signals from a signal source; and
   an isolator apparatus including:
      an input communicatively coupling the isolation apparatus to the receiver through a first cable, the input providing a first power path and a first communication path communicatively coupled to the first cable;
      an output communicatively coupling the isolation apparatus to the antenna through a second cable, the output providing a second power path and a second communication path communicatively coupled to the second cable;
      a DC-DC converter communicatively coupled to the first and second power paths that transfers electrical power between the first and second power paths; and
      an opto-isolator communicatively coupled to the first and second communication paths that transfers RF signals between the first and second communication paths;
      wherein the DC-DC converter and the opto-isolator cooperatively operate to electrically isolate the antenna and the receiver.

17. The system of claim 16, wherein the DC-DC converter includes a dielectric material providing at least 10,000 volts of insulation.

18. The system of claim 17, wherein the receiver comprises a set-top box, the antenna comprises a satellite antenna and the signal source comprises a satellite.

19. The system of claim 16, further comprising a transformer that transfers control signals between the receiver and the antenna, electrically isolating the receiver from the antenna.

20. The system of claim 16, wherein the isolator apparatus further comprises a power supply electrically coupled to a power source that supplements the electrical power provided to the antenna by the receiver.

* * * * *